United States Patent [19]

Cornils et al.

[11] Patent Number: 5,108,526

[45] Date of Patent: Apr. 28, 1992

[54] VARIABLE FLOW RATE EXTRUSION APPARATUS FOR APPLYING A POLYMER PROFILE TO AN ARTICLE

[75] Inventors: Gerd Cornils, Merzenich Girbelsrath; Werner Siegel; Heinz Kunert, both of Cologne; Ludwig Schwartz, Aachen, all of Fed. Rep. of Germany

[73] Assignee: Saint Gobain Vitrage International, Courbevoie, France

[21] Appl. No.: 661,353

[22] Filed: Feb. 26, 1991

[30] Foreign Application Priority Data

Feb. 26, 1990 [DE] Fed. Rep. of Germany ....... 4006006

[51] Int. Cl.⁵ .............................................. B29C 47/04
[52] U.S. Cl. .................................. 156/108; 156/109; 156/244.11; 156/244.25; 264/177.1; 264/177.16; 425/461; 425/465; 425/466
[58] Field of Search ............... 156/106, 107, 108, 109, 156/244.11, 244.22, 244.25; 264/177.1, 177.16; 425/461, 465, 466

[56] References Cited

U.S. PATENT DOCUMENTS

| | | | |
|---|---|---|---|
| 2,402,281 | 6/1946 | Green | 425/465 |
| 2,982,995 | 5/1961 | Groleau | 425/466 |
| 3,957,406 | 5/1976 | Battersby | 425/458 |
| 4,120,999 | 10/1978 | Chevel et al. | 156/109 |
| 4,145,173 | 3/1979 | Pelzer et al. | 425/466 |
| 4,531,326 | 7/1985 | Ballocca et al. | 425/465 |
| 4,576,773 | 3/1986 | Azzola et al. | 264/177.16 |
| 4,581,276 | 4/1986 | Kunert et al. | 156/108 |
| 4,704,175 | 11/1987 | Kunert et al. | 156/293 |
| 4,910,071 | 3/1990 | Kunert | 156/108 |
| 4,933,032 | 6/1990 | Kunert | 156/244.25 |
| 4,938,521 | 7/1990 | Kunert | 156/108 |
| 4,986,867 | 1/1991 | Braendle et al. | 52/208 |

*Primary Examiner*—Caleb Weston
*Attorney, Agent, or Firm*—Pennie & Edmonds

[57] ABSTRACT

The invention relates to an apparatus for extruding a polymer profile directly onto the surface of a glass plate and particularly along a peripheral edge thereof. The extruded polymer profile is provided with a sealing and centering lip located on and projecting over the circumferential peripheral surface of the glass plate. The extrusion die has at least one supply channel for the polymer to be extruded. One supply channel or portion thereof leads the polymer material substantially to the portion of the die orifice directed toward the center of the plate. The other supply channel essentially supplies the portion of the orifice directed toward the outside. The supply channel may be provided with a shutoff device which regulates the volume flow. The regulation of the shutoff device takes place as a function of the radius of curvature (R) of the path covered by the extrusion die.

20 Claims, 4 Drawing Sheets

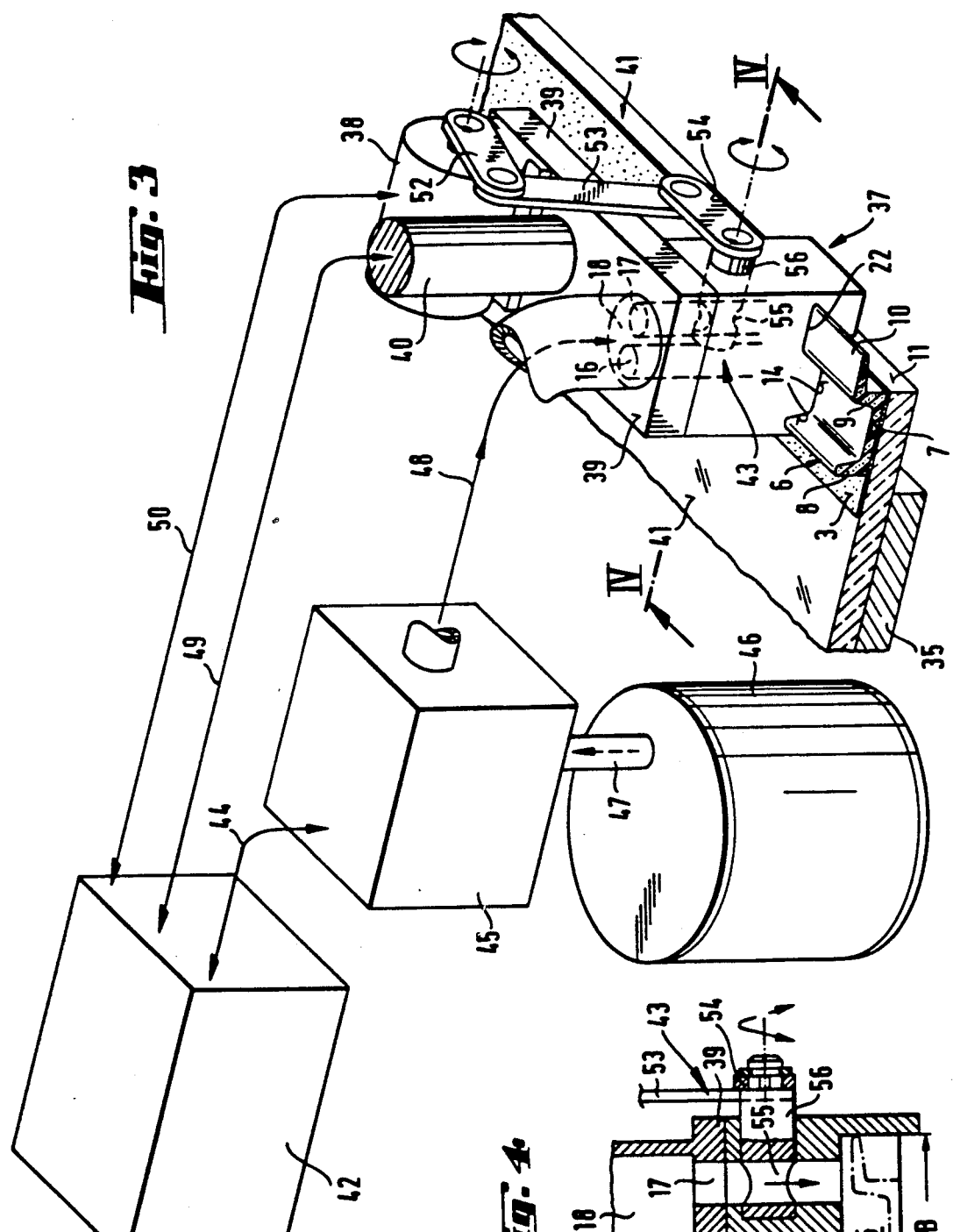
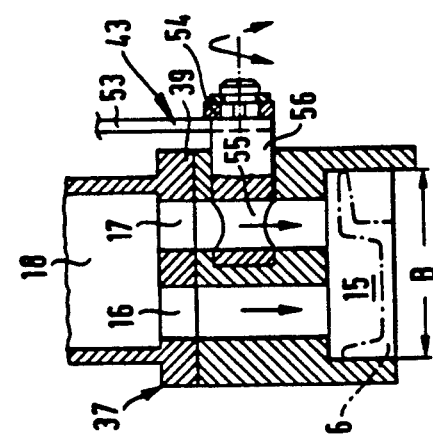

VARIABLE FLOW RATE EXTRUSION APPARATUS FOR APPLYING A POLYMER PROFILE TO AN ARTICLE

TECHNICAL FIELD

The invention relates to an apparatus for shaping and applying a preformed polymer circumferentially to a peripheral edge of an article.

BACKGROUND OF THE INVENTION

It is known to provide a glass plate or glazing (these terms are used interchangeably herein) with a frame-like polymer profile. For instance such profiles have been applied directly to a glass surface by an extrusion die whereby the profile is extruded in a final shape as it is applied. With the use of certain known methods, the glass surface is first prepared for increased adhesion to the profile. U.S. Pat. Nos. 4,581,276, 4,704,175, 4,938,521, and 4,933,032 as well as U.S. application Ser. Nos. 084,863 and 08,867 filed on Aug. 13, 1987 and U.S. application Ser. No. 314,302 filed on Feb. 23, 1989, the disclosures of which are hereby incorporated herein by reference, disclose products, processes and apparatus as described above.

Polymer profiles may be extruded onto a glazing in a final shape and thereafter fully cured for increased hardness. Extruded profiles affixed to a glass surface may, for example, be used as an intermediate body to which an adhesive bead is applied during the assembly of automotive windows, wherein the adhesive bead bonds the glass to a corresponding frame. In this regard, a profile may advantageously be contoured so as to have a channel-like cross section for receiving and retaining such an adhesive bead. Profiles may also be designed to incorporate a boundary web to limit the spread of adhesive from the profile towards a center portion of the glazing wherein the adhesive would interfere with the transparency of the glass. Extruded profiles may also incorporate a lip, i.e. an extension of extruded polymer, parallel to and extending beyond the peripheral edge of the glazing. Such a lip may serve to aid in positioning the glazing within a frame during assembly and also serve to close a gap which occurs between the circumferential periphery of the glazing and a frame flange into which the glazing is affixed.

It is possible for an extruded profile to simultaneously fulfill all the functions described above. An example of such an extruded profile has a "U"-shaped profiled portion with a relatively wide base surface and a lip-like portion projecting outwardly beyond the plate's edge. The wide base serves as an intermediate body for placement and retention of an adhesive bead, while the "U"-shaped profiled portion serves as a boundary web preventing the spread of adhesive from the profile toward the center portion of a glass plate where, as noted above, the adhesive would otherwise interfere with the transparency thereof. Additionally, the lip-like portion serves to initially position and center a window during assembly, and as a decorative cover filling the gap between a circumferential peripheral edge of the glazing and a frame flange within which the glazing is affixed. Glass plates pre-equipped with such a multi-purpose extruded polymer profile are increasingly used in practice (see, e.g., Karl Heinz Brueck: "Fahrzeugverglasung" Verlag Vieweg, 1990).

In processes which provide an application of extruded pre-shaped polymer profile directly onto the surface of a glazing, an extrusion die is located proximate to, and passed circumferentially along a peripheral edge of the glazing. With the aid of known extrusion dies, it is possible to produce a uniform extruded profile even in profiles exhibiting a complex cross-sectional shape, provided that the path of the die is roughly linear.

In prior art devices used for this purpose, as a die head of a profile extrusion apparatus moves along the peripheral edge of a glazing, a calibrated opening in the die head extrudes a contoured polymer profile onto the edge. The calibrated opening has an inner portion, and an outer portion located adjacent and contiguous with the inner portion.

As used in this specification, the terms "outer" or "outward" and the terms "inner or inward") refer to a relative position of two objects, or portions thereof, in relation to their proximity to a point located in the center of a glass plate which is to receive a polymer profile. The "outer" object, or portion thereof is always distal to the center of the glass in comparison with a more medially positioned "inner" object or portion of an object. When these terms are used to describe parts of a moving die head, they refer to relative positions of parts located within the die head when it is located in a working position along the peripheral edge of a glazing.

The inner and outer portions of the calibrated openings of the prior art devices described above extrude corresponding inner and outer portions of the profile. As profile is applied to the glazing along roughly linear portions of the glazing's peripheral edge, the circumferential distance traveled about the peripheral edge of the glazing by the inner and outer portions of the calibrated opening would be the same for both portions, and thus the proper extrusion rate necessary to provide a uniform cross section of an inner and outer portion of profile would remain constant for each portion while traversing a linear track.

However, at the corners of the glazing, or at curved sections thereof, the outer portion of the calibrated opening must traverse a greater distance than the inner portion. Therefore, in corners or curved areas, a rate of extrusion of profile equal to the rate of extrusion at linear areas will not yield a uniform cross section of a profile since the outer portion must traverse a greater distance at these locations. That is, at corners and curved areas, the outer portion of the calibrated opening will simply not extrude a sufficient amount of profile so as to cover the distance traversed. Rather, the outer section of the calibrated orifice will produce an outer portion of profile exhibiting distortion and insufficient cross section. Conversely, if the extrusion rate at the outer portion of the calibrated orifice is raised sufficiently to produce a uniform cross-section at curved areas or corners, this same rate will be excessive as to the extrusion deposited by the outer portion of the calibrated orifice at linear portions of the peripheral edge.

Moreover, as the radius of the glazing's curved areas or corners decrease, i.e., as the curvature of corners or curved areas becomes more acute, the disparity between the distance traveled circumferentially by the inner and outer portions of the calibrated opening increases, causing a disparity in the extrusion rates required to obtain a profile with uniform and sufficient inner and outer cross-section. This disparity becomes even more pronounced in the case of profiles including a radially extended outward directed lip-like portion.

Extrusion die devices as known in the prior art have therefore been limited in that they have not been able to produce a profile with a uniform cross section at curved peripheral edges or corners of a glazing. Although process parameters such as temperature, viscosity, and pressure of polymer delivery have been adjusted to bring about improvements, these parameters can only be varied within narrow limits before the adjustments themselves cause additional problems.

What is needed is a die extrusion apparatus for applying a polymer profile circumferentially to a peripheral area of a glazing which applies a profile exhibiting a substantially uniform cross section to the peripheral edge, including curved sections and corners thereof.

SUMMARY OF THE INVENTION

Now in accordance with the present invention a polymer extrusion die apparatus is provided which forms an extruded polymer profile upon a glazing exhibiting a substantially uniform cross-section, even along curved areas and corners. The apparatus of the present invention includes a moving extrusion die head which circumferentially traverses the peripheral edge of a glazing while extruding a polymer profile thereon. Polymer is supplied to the die head by means of at least one supply line. The supply line(s) delivers polymer under pressure to at least one supply channel, at least one of the supply channel(s) including a means for controlling flow of polymer therethrough.

By utilizing the means for controlling the flow of polymer through the at least one supply channel, the flow of polymer through the inner or outer portion of the distributing chamber and, in turn, the corresponding inner and outer portions of the calibrated die orifice it supplies may also thereby be controlled.

Therefore, for example, an extruded polymer will form a profile having a large cross section when extruded through the inner portion of the calibrated orifice. and a small cross-section when extruded through its outer portion. the flow rate through the supply channel (when more than one supply channel is utilized), supplying polymer to the outer portion of the distributing chamber and thus the outer calibrated orifice, may be decreased so as to supply the proper quantity of polymer to form inner and outer portions of the polymer profile at a given die head movement rate.

The supply channel(s) further direct polymer into a distributing chamber. The distributing chamber includes an inner portion positioned (when the die head is located proximate to the peripheral edge of a glazing it its working position), proximate to and within the glazing's peripheral edge to which profile is to be applied and is located adjacent and contiguous with an outer portion of the distribution chamber positioned proximate to and extending outwardly beyond the glazing's peripheral edge.

The inner and outer portions of the distributing chamber are located proximate and supply polymer to inner and outer portions of a calibrated die orifice, through which polymer is shaped and extruded onto the circumferential peripheral edge of a glazing when the die head is positioned adjacent to the peripheral edge of the glazing in its working position. The inner portion of the calibrated orifice is located proximate to and within the glazing's peripheral edge to which profile is to be applied. The outer portion of the calibrated orifice is located adjacent and contiguous with the inner portion and is positioned proximate to and extends outwardly beyond the peripheral edge.

As explained above, as the die head approaches curved sections or corners of a glazing's periphery, the radially outwardly directed portion of the die head moves at a faster rate about the circumference of these curves or corners than it does at roughly linear portions of the peripheral edge. Therefore, the outer portion of the calibrated orifice traverses these curved areas or corners at a greater rate than it traverses linear areas. Such rate discrepancies can, as explained above, result in an insufficient or non-uniform application of the profile extruded by the outer portion of the calibrated orifice. By utilizing the control means to increase flow rate of the outer portion of the calibrated orifice at corners and curves of a glazing's peripheral edge, such discrepancies are avoided.

In a first embodiment of the present invention one supply channel is utilized having an elongated cross-section prior to its entry into the distributing chamber. This channel essentially extends over the entire width of the calibrated die orifice. The control means utilized for controlling the rate of polymer flow through the supply channel comprises a suitable slide which narrows the cross-section of the supply channel to a greater extent at one end than at the other, so that the polymer flow cross-section is shaped like a wedge or triangle.

In accordance with another embodiment of the present invention, the supply channel can be formed by a deformable tube or hose, in which the cross-sectional change is brought about by a bore limiting device acting on the tube or hose from the outside.

According to a further embodiment of the present invention, the apparatus includes at least two supply channels which issue into the distributing chamber in a direction at right angles to the die movement direction along the peripheral edge of a glass plate. The supply channels have a reciprocal spacing such that one supply channel essentially supplies pressurized polymer to an inner portion of the calibrated orifice and a second supply channel supplies pressurized polymer to an outer portion of the calibrated orifice. At least one of the two supply channels is provided with means for regulating the flow of polymer therethrough.

According to another embodiment of the present invention a profiled polymer extrusion apparatus is provided, including two supply channels. The two supply channels are in turn supplied by a single polymer supply line connected thereto so that both supply channels are supplied with polymer which is under the same pressure. This embodiment includes a means for regulating the polymer flow located within at least one supply channel.

In a still further embodiment of the present invention, an extrusion die apparatus is provided which includes two supply lines, each of which is connected and supplies polymer to two corresponding supply channels. In the subject embodiment, the means for regulating polymer flow through the supply channels may be regulated by means positioned outside the die body. Each supply line may, for example, be provided with its own dosing device and/or it own pump. The dosing device and/or pump is in each case controlled as a function of the course of the path travelled by the die and the required cross sectional area of a given profile The extrusion die apparatus according to the invention thus make it possible to solve the problem of producing a constant profile cross-section when extruding a polymer profile in the corner regions of glass plates, even if the extrusion die traverses a curve having a very small radius. The regulation of the cross-sectional polymer flow through the at least one supply channel, and, as explained above, the corresponding regulation of the flow through the calibrated orifice, is carried out as a function of the curvature of the particular path the die head traverses. The regulation of polymer flow through the cross-section of a supply channel may be regulated by, for example, a valve located within the supply channel or in a supply line directing polymer to the supply channel. This regulation may, for example, be achieved mechanically with the aid of a cam guide located on a support means provided for supporting the glass plate and along which slides a cam activated sliding valve which is slidingly positioned within a supply channel's cross-section. It is also possible to operate the valve modifying the supply channel's cross-section with the aid of a servomotor, which is controlled in accordance with a predetermined program.

BRIEF DESCRIPTION OF THE FIGURES

FIG. 3 is a diagrammatic view of another embodiment of the present invention in which the supply channel flow controlling means is operated by means of a servomotor.

FIG. 4 is a sectional view of the embodiment illustrated in FIG. 3.

DETAILED DESCRIPTION

Figure 1:
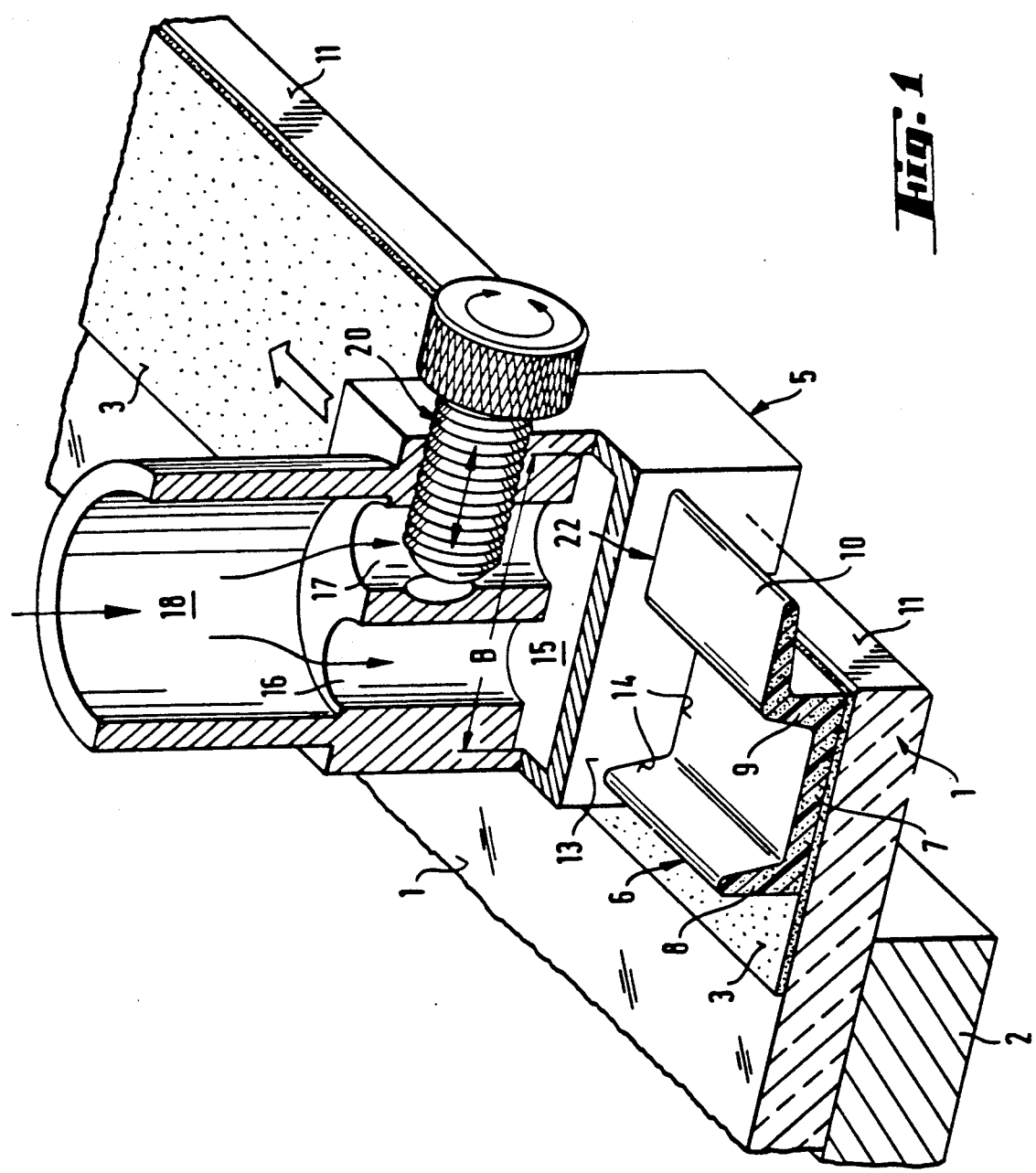
FIG. 1 is a perspective view of one embodiment of the present invention including the internal portions of the supply line, supply channels, and distribution chamber.

As shown in FIG. 1, during the application process, glass plate 1, i.e., which is to be provided with an extruded polymer profile, rests on a substrate 2 and is secured to the latter by appropriate means, e.g., by suction disks or plates (not shown). The peripheral edge area of the glass plate 1 is provided with a border layer 3 comprised of an opaque enamel. The border layer 3, which can be referred to as a decorative frame, is applied to the glass surface as a baking varnish with the aid of a screen printing process. Baking then takes place at an elevated temperature. The layers may serve to enhance the adhesion of the extruded polymer profile to the peripheral area of the glass and/or serve as a visual barrier so as to block from view an adhesive bead utilized to affix the glass plate to its receptive frame.

With the aid of extrusion die 5, profile 6, formed from an extrudable polymer, is applied to a peripheral area of the glass plate, i.e., to layer 3. The polymer for forming the extruded profile 6 may be comprised, for example, of a single-component polyurethane system which hardens in the presence of moisture or a two-component polyurethane system. The polymer utilized with the apparatus of the present invention is a viscous material, providing an extruded profile in final form immediately upon extrusion from the calibrated orifice. The curing of the polymer serves to increase the hardness of the profile, but does not affect its original extruded cross-sectional configuration. Optionally, in a preceding process stage, the surface to be coated with the extruded profile 6 is cleaned with an appropriate cleaning liquid and provided with an adhesion-improving coating in a known manner.

In one embodiment of the present invention as illustrated in FIG. 1, the extruded polymer profile 6 exhibits a "U"-shaped cross-section with a base 7, an inner web 8 roughly at right angles to the base, an outer web 9 also roughly at right angles to the base 7 and a lip 10 bent away roughly at right angles from the web 9. Lip 10 projects, e.g., 5 to 10 mm, outwardly beyond the circumferential surface 11 of the glass plate 1.

The extrusion die 5 forming the extruded polymer profile 6 on the glass plate 1 is provided on its rear side 13, (considered "rear" in relation to the die movement direction indicated by arrow 75), with a sized or calibrated orifice 14 having an extension which is open on the underside. Within the extrusion die 5 is provided a distributing chamber 15 proximate to orifice 14 whose width roughly corresponds to the width of orifice 14. Two supply channels issue into the distributing chamber 15. Supply channel 16 is located adjacent, and issues into that area of distribution chamber 15 supplying polymer to an area of the calibrated orifice 76 in which is formed the U-shaped, profiled part of the extruded polymer 6, (the inner portion). Supply channel 17 is located above and issues into that portion of distribution chamber 15 supplying polymer to an area of the calibrated orifice 22 in which lip 10 of the profile is formed, (the outer portion). Socket 18 which is connected to a polymer supply tube (not shown) provides a flow of polymer to both supply channels which in turn issue into the distributing chamber.

The cross-section of supply channel 17 may be modified by a suitable shutoff device. In the embodiment illustrated in FIG. 1, the cross-sectional modification is effected by a knurled-head screw 20, which is positioned at right angles to the supply channel 17 in a corresponding thread in the die body. The penetration depth of screw 20 into supply channel 17 can be manually adjusted. If it is found, for example, when working with the die that too much polymer is passing out of the portion 22 of the orifice 14 forming the lip 10, so that the latter corrugates, then by operating the knurled-head screw 20, the polymer volume flow flowing to this part of the die orifice can be reduced to such an extent within the die that a completely satisfactory geometry is achieved for lip 10.

Conversely, if it is found that too little polymer material passes out of portion 22 of die orifice 14, and consequently that the wall thickness of lip 10 is inadequate or non-uniform, then by rotating the knurled-head screw 20 in the opposite direction the passage cross-section in the supply channel 17 is increased and consequently the volume flow within the die flowing towards the portion 22 is also increased.

Figure 2:
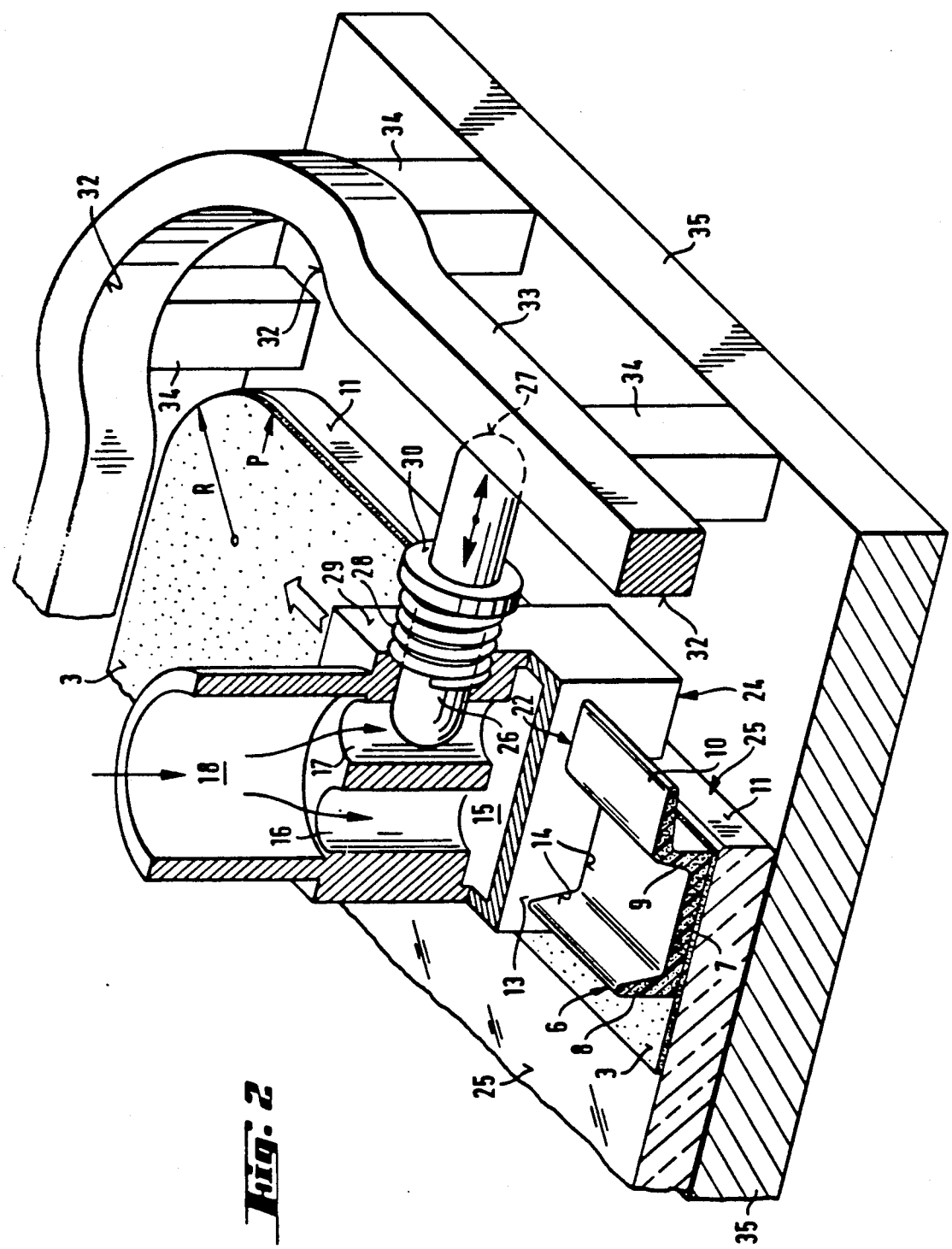
FIG. 2 illustrates an embodiment of the present invention in which the supply channel flow controlling means is operated by a frame guided cam.

FIG. 2 illustrates the essential elements of applicants' apparatus for extruding an extruded polymer profile 6, which includes means for cross-sectional modification to the supply channel 17 during the extrusion process, i.e., during the movement of the extrusion die 24 along the circumferential surface 11 of the glass plate 25 and in accordance with the particular requirements.

Extrusion die 24 has the same basic construction as the die shown in FIG. 1, i.e., the rear wall 13 of the die body has a calibrated orifice 14, whose external portion 22 shapes the outwardly projecting lip 10. There are also two supply channels 16 and 17. The outer supply channel 17 issues into a section of the distributing chamber above and supplying polymer to the area 22 of calibrated orifice 14 extruding lip 10 of the polymer profile.

In the embodiment illustrated in FIG. 2, a plunger 26 serves to modify the passage cross-section of supply channel 17. Plunger 26 is slidingly mounted in the die body and projects at right angles into the supply channel 17. The plunger is provided at a front end projecting out of the die body with a tip 27. A helical spring 28, which contacts on one end, side wall 29 of die head 24, and, on the other end, collar 30 (affixed to the plunger), biases an inner tip of said plunger in a direction out from its position within the supply channel. Outer tip 27 of plunger 26 is biased against the cam guide 32 of frame 33 by the helical spring and follows said guide 32 during the movement of the extrusion die. The frame 33 forming the cam guide 32 is placed via supports 34 on support plate 35, upon which is fixed the glass plate 25.

As extrusion die 24 approaches point P in FIG. 2 on its path along the circumferential surface 11 where the rounded corner area of the glass plate commences with a radius of curvature R, the cam guide 32 initially has a curvature in the opposite direction. At this point plunger 26 is biased outwardly by the action of the helical spring 28 and consequently increases the passage cross-section in the supply channel 17. Therefore, there is a larger volume flow of polymer into portion 22 of orifice 14. A larger volume flow is required because here lip 10 has a much greater length due to the larger radial path along which it is applied, as compared with the length of inner web 8. After passing round the corner area of the glazing's peripheral edge, the distance between the cam guide 32 and the circumferential surface 11 decreases again, so that the plunger 26 is moved back into its starting position and the passage cross-section in supply channel 17 is once again reduced.

FIGS. 3 and 4 diagrammatically illustrate an embodiment of the present invention in which the regulation of the supply channel 17 within extrusion die 37 takes place by means of a program-controlled servomotor 38. In place of the electric servomotor 38, it is, however, possible to use a program-controlled, hydraulic drive unit. The extrusion die 37 and the electric servomotor 38 are mounted on a common mounting support 39. The latter is positioned at the end of an arm 40 of a robot (not shown). Movement of the robot arm is controlled by a path program corresponding to the contour of the glass plate 41 by means of the diagrammatically represented control mechanism 42. Simultaneously with the path program for the robot arm 40 and therefore for the extrusion die 27, the program influencing the control mechanism 42 receives additional information for both the supply and dosing of polymer to be extruded and for operating the valve 43 which modifies the cross-section of the supply channel 17 to the distributing chamber 15 in the die 37. The instructions provided by the programmed control mechanism 42 which relate to the dosing and supply of polymer to be extruded are transferred via the control line 44 to the pumping and dosing station 45. Pumping and dosing station 45 draws necessary polymer material from a storage tank 46 via line 47 after which an appropriate dosing mechanism regulates the supply of polymer to extrusion die 37 via the line 48.

As a function of the path program instructions for the extrusion die 37 and which, as illustrated by the diagrammatic view, are transferred by control line 49 to a servomotor moving the robot arm 40, servomotor 38 is controlled by line 50. A lever 52 is located on the shaft of the servomotor 38 and via coupling rod 53 transfers the movement to lever 54, which operates a cylinder 56 provided with a passage opening 55, so that the flow quantity of polymer in the supply channel 17 may be regulated.

Figure 5:
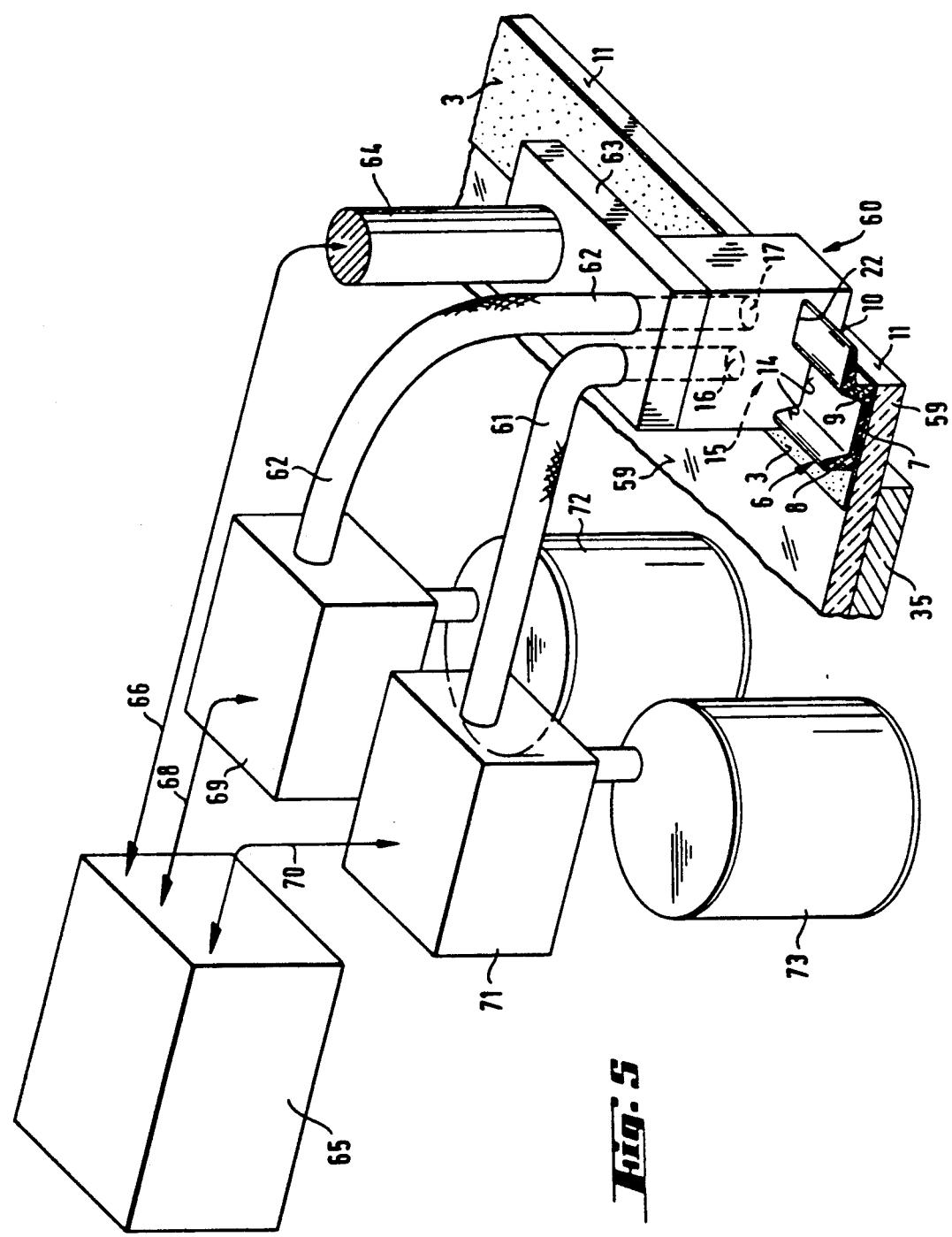
FIG. 5 illustrates an embodiment of the present invention including two supply lines.

FIG. 5 diagrammatically illustrates another embodiment of the present invention. In this embodiment extrusion die 60 is not provided with means for controlling the flow through the supply channel and instead each supply channel is provided with its own supply line. Supply tube 61 is connected to the supply channel directed towards the inner portion of the calibrated orifice while supply tube 62 is connected to the supply channel supplying polymer to the outer portion of the calibrated orifice 22, and thus lip 10. The extrusion die 60 is mounted on a mounting support 63 located at the end of a robot arm 64. The path control of the robot arm 64 is regulated by using a program control means 65 and control line 66.

In accordance with a predetermined program, the control mechanism 65 regulates two independent pumping and dosing means via control line 68 to pumping and dosing means 69 and via control line 70 to pumping and dosing means 71. The pumping and dosing means 69 pumps the polymer to be extruded out of the storage tank 72 and directs polymer flow, in a regulated quantity, into supply channel 62 of extrusion die 60. Pumping and dosing means 71 pumps the polymer material out of the storage tank 73 and directs polymer flow, in a regulated quantity, into supply line 61 of the extrusion die. The program takes into account the varying volume flow changes required by the geometrical path of the extruded polymer profile in such a way that the latter always has an optimum design and configuration.

The embodiment described in FIG. 5 permits the co-extrusion of two different polymer materials. This embodiment is, for example, suitable for producing an extruded polymer profile on the glass plate in which the lip 10 is made from a different material than the remainder of the profiled section. For example, the pumping and dosing means 71 can deliver from the storage tank 73 to the supply tube 61 a single-component polyurethane which hardens in the presence of moisture, which is relatively hard after curing, while the supply tube 62 supplying lip 10 is supplied with a single-component polyurethane which hardens in the presence of moisture from storage tank 72 which, following curing, has soft, rubber-elastic characteristics.

The described embodiments relate to the use of an inventive apparatus for completing car glass plates or glazings. However, the apparatus can also be used with articles other than glass plates. Thus, it is possible with the aid of the apparatus of the present invention to provide the edge of windows or doors, such as car or refrigerator doors and the like, directly with an all-round extruded polymer profile. The extruded profile can be formed from a polymer with rubber-elastic characteristics and can in particular fulfil sealing functions. In this way it is possible to easily and economically produce directly on a door an otherwise expensive sealing profile, which hitherto had to be separately produced and subsequently fixed to the door as a closed frame.

I claim:

1. An apparatus for applying a polymer profile directly upon a peripheral edge of an article wherein said apparatus comprises:

a moving die head positioned adjacent to the peripheral edge of a glazing and adapted so as to circumferentially traverse the entire peripheral edge, said die head including at-least one-polymer supply channel, said at least one supply channel located proximate to, and providing a flow of polymer into a distributing chamber, said distributing chamber located proximate to, and providing a flow of polymer to a calibrated orifice, said orifice configured and adapted to extrude a polymer profile of a predetermined cross-sectional shape wherein said apparatus includes a means for modifying said polymer flow through at least one of the said at least one supply channels which allows control of the ratio between polymer extruded from said orifice directed towards an inner portion of said profile to polymer extruded from said orifice directed towards an outer portion of said profile.

2. The apparatus of claim 1 wherein said means for modifying the polymer flow through said at least one supply channel includes a programmed electronic control system comprising;
- a programmed electronic processor;
- a servomotor which controls a flow regulating valve located in said at least one supply channel; and
- a moving die head control device;
- wherein said electronic processor includes a servomotor controlling function, and wherein said processor controls the servomotor utilized for operating the flow regulating valve located in at least one supply channel and a moving die head control function which controls the path and speed of the extrusion die's movement circumferentially about the glass plate's peripheral edge.

3. The apparatus of claim 1 wherein said at least one supply channel is comprised of a deformable conduit, and wherein said means for modifying the polymer flow through at least one of said at least one channel is a clamp acting upon the outside of said conduit so as to vary its bore.

4. The apparatus of claim 1 wherein the means for modifying said polymer flow through at least one supply channel comprises a screw valve which is positioned at right angles to said channel in a corresponding thread located within said die head and wherein penetration depth of the valve into said supply channel can be manually adjusted by rotating said screw valve.

5. The apparatus of claim 1 wherein the means for modifying the polymer flow through at least one of said at least one supply channel comprises:
- a sliding valve located within said die head, said valve including an inner end projecting into said at least one supply channel and adapted so as to variably adjust the polymer flow within said at least one supply channel, said valve including an outer end extending outwardly beyond the body of said die head, and said valve being biased outwards away from said supply channel by a spring mounted on said valve; and
- a mechanical frame cam guide located outside and adjacent to the circumferential path of said die head;
- wherein said tip is variably forced into said supply channel by said cam guide to control the polymer flow within said supply channel.

6. An apparatus for applying a polymer profile directly upon a peripheral edge of an article wherein said apparatus comprises:
- a moving die head positioned adjacent to the peripheral edge of a glazing and adapted so as to circumferentially traverse the entire peripheral edge, said die head including at least two polymer supply channels, said at least two supply channels located proximate to, and providing a flow of polymer into a distributing chamber, said distributing chamber located proximate to, and providing a flow of polymer to a calibrated orifice, said orifice configured and adapted to extrude a polymer profile of a predetermined cross-sectional shape wherein said apparatus includes a means for modifying said polymer flow through at least one of the said at least two supply channels which allows control of the ratio between polymer extruded from said orifice directed towards an inner portion of said profile to polymer extruded from said orifice directed towards an outer portion of said profile.

7. The apparatus according to claim 6 wherein each of the at least two supply channels are connected to, and receive polymer from an independent supply line, and the means for controlling polymer flow through said supply channel is located outside the moving die head.

8. The apparatus of claim 6 wherein said at least two supply channels are each comprised of a deformable conduit, and wherein said means for modifying the polymer flow through at least one of said at least two channels is a clamp acting upon the outside of said conduit so as to vary its bore.

9. The apparatus of claim 6 wherein the means for modifying said polymer flow through at least one of said at least two supply channels comprises a screw valve which is positioned at right angles to a channel adjacent thereto in a corresponding thread located within said die head and wherein penetration depth of the valve into said supply channel can be manually adjusted by rotating said screw valve.

10. The apparatus of claim 6 wherein the means for modifying the polymer flow through at least one of said at least two supply channels comprises:
- said at least one supply channel each having a valve including an inner end projecting into said supply channel and adapted so as to variably adjust the polymer flow within said supply channel, said valve including an outer end extending outwardly beyond the body of said die head, and said valve being biased outwardly away from said supply channel by a spring mounted on said valve; and
- a mechanical frame cam guide located outside and adjacent to the circumferential path of said die head;
- wherein said inner end is variably forced into said supply channel by said cam guide to control the polymer flow within said supply channel.

11. The apparatus of claim 6 wherein said means for modifying the polymer flow through at least one of said at least two supply channels includes a programmed electronic control system comprising;
- a programmed electronic processor;
- a servomotor which controls a flow regulating valve located in said at least one supply channel; and
- a moving die head control device;
- wherein said electronic processor includes a servomotor controlling function, and wherein said processor controls the servomotor utilized for operating the flow regulating valve located in at least one of the said at least two supply channels and a moving die head control function which controls the path and speed of the extrusion die's movement circumferentially about the glass plate's peripheral edge.

12. The apparatus of claim 6 wherein said at least two supply channels issue into said distributing chamber in a direction at right angles to the die movement direction and wherein said supply channels have a reciprocal placement so that pressurized polymer is supplied by an inner supply channel to an inner portion and by an outer supply channel to an outer portion of the calibrated orifice, said inner portion of said orifice extruding polymer profile onto the glass plate surface and said outer portion of the orifice extruding polymer profile onto and beyond a peripheral edge of said glazing.

13. The apparatus according to claim 6 wherein said at least two supply channels are supplied with a polymer flow from a common supply line, said supply line receiving a polymer flow regulated and provided by a pumping and dosing means located outside said die head.

14. A process for applying an extruded polymer profile circumferentially to a peripheral edge of an article, wherein said process comprises:
   positioning an extrusion die adjacent to a peripheral edge portion of said article, said extrusion die comprising a moving die head adapted so as to circumferentially traverse the entire peripheral edge, said die head including at least one polymer supply channel, said at least one supply channel located proximate to, and providing a flow of polymer into a distributing chamber, said distributing chamber located proximate to, and providing a flow of polymer to a calibrated orifice, said orifice configured and adapted to extrude a polymer profile of a predetermined cross-sectional shape wherein said extrusion die includes a means for modifying said polymer flow through at least one of the said at least one supply channels which allows control of the ratio between polymer extruded from said orifice directed towards an inner portion of said profile to polymer extruded from said orifice directed towards an outer portion of said profile;
   moving said die head along substantially linear and curved sections of said peripheral edge while said die head extrudes profile thereon; and
   regulating the flow of polymer through the at least one supply channel as a function of the radius of curvature of the path traversed by the moving die head.

15. The process of claim 14 which further comprises moving said die head with an electronic data processor controlled robot arm.

16. The process of claim 14 which further comprises moving said die head along said linear and curved sections with a robot arm.

17. The process of claim 16 which further comprises controlling the robot arm with an electronic data processing unit.

18. The process of claim 17 which further comprises controlling the flow of polymer through the at least one supply channel with an electronic data processing unit.

19. The process of claim 14 which further comprises controlling the flow of polymer through said at least one supply channel with a cam and modifying the flow of polymer through said at least one supply channel.

20. A process for applying a polymer profile directly upon a peripheral edge of an article, said process comprising:
   moving a die head circumferentially along the peripheral edge of said article, said die head including at least one polymer supply channel, and said channel located proximate to a distributing channel;
   providing a flow of polymer into a calibrated orifice, said orifice located proximate to the distributing channel;
   configuring the calibrated orifice to extrude a polymer profile of a predetermined cross-sectional shape; and
   modifying the polymer flow through at least one of the at least on supply channels so as to control the ratio between the polymer extruded from the orifice directed towards an inner portion of the profile to the polymer extruded from the orifice directed towards an outer portion of the profile.

* * * * *